US009686385B2

United States Patent
Li (10) Patent No.: US 9,686,385 B2
(45) Date of Patent: Jun. 20, 2017

(54) APPARATUS FOR WIRELESS COMMUNICATION

(71) Applicant: Nokia Corporation, Espoo (FI)

(72) Inventor: Pei Li, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/654,652

(22) PCT Filed: Dec. 21, 2012

(86) PCT No.: PCT/US2012/071207
§ 371 (c)(1),
(2) Date: Jun. 22, 2015

(87) PCT Pub. No.: WO2014/098889
PCT Pub. Date: Jun. 26, 2014

(65) Prior Publication Data
US 2016/0198027 A1 Jul. 7, 2016

(51) Int. Cl.
*H04M 1/00* (2006.01)
*H04M 1/02* (2006.01)
(Continued)

(52) U.S. Cl.
CPC ........... *H04M 1/026* (2013.01); *H01Q 1/243* (2013.01); *H01Q 5/364* (2015.01); *H01Q 5/40* (2015.01); *H01Q 9/0421* (2013.01); *H01Q 9/42* (2013.01)

(58) Field of Classification Search
CPC H01Q 1/243; H01Q 9/42; H01Q 1/38; H01Q 9/0421; H01Q 1/2266; H01Q 13/10;
(Continued)

(56) References Cited

U.S. PATENT DOCUMENTS

2011/0109525 A1 5/2011 Takemura et al. ............ 343/904
2011/0241949 A1* 10/2011 Nickel .................. H01Q 1/243
343/702

(Continued)

FOREIGN PATENT DOCUMENTS

CN 102110887 A 6/2011
DK WO 2011000416 A1 * 1/2011 ............. H01Q 1/243
(Continued)

OTHER PUBLICATIONS

Ying, Zhinong; "Antennas in Cellular Phones for Mobile Communications;" Proceedings of the IEEE; vol. 100, No. 7, Jul. 2012; pp. 2286-2296.
(Continued)

Primary Examiner — Ajibola Akinyemi
(74) Attorney, Agent, or Firm — Harrington & Smith (57) ABSTRACT

An apparatus (122) including: a first feed point (26); a first radiator (28) coupled to the first feed point; a housing defining an interior surface (30) of the apparatus and including a first conductive cover portion (24) coupled to the first radiator; a ground member (18) coupled to the first conductive cover portion and positioned at least partially within the interior surface (30) of the housing, at least the first conductive cover portion and the first radiator having an electrical length configured to resonate in a first operational frequency band, the first radiator being configured to electromagnetically couple to the first conductive cover portion.

19 Claims, 7 Drawing Sheets (51) Int. Cl.
*H01Q 1/24* (2006.01)
*H01Q 9/04* (2006.01)
*H01Q 9/42* (2006.01)
*H01Q 5/364* (2015.01)
*H01Q 5/40* (2015.01)

(58) Field of Classification Search
CPC .......... H01Q 1/24; H01Q 1/245; H01Q 1/273; H01Q 1/48; H01Q 1/526; H01Q 9/0407; H01Q 9/045; H01Q 13/106; H01Q 1/22; H01Q 1/2208; H01Q 1/2233; H01Q 1/244
USPC ...................................................... 455/575.1
See application file for complete search history.

(56) References Cited

U.S. PATENT DOCUMENTS

| | | | |
|---|---|---|---|
| 2012/0001815 A1 | 1/2012 | Wong et al. | 343/749 |
| 2012/0146742 A1 | 6/2012 | Caron et al. | 333/132 |
| 2012/0157175 A1 | 6/2012 | Golko et al. | 455/575.7 |
| 2012/0169547 A1 | 7/2012 | Oh et al. | |
| 2012/0194404 A1* | 8/2012 | Arkko | H01Q 1/243 343/867 |
| 2012/0231750 A1 | 9/2012 | Jin et al. | 455/77 |
| 2013/0154886 A1* | 6/2013 | Isohatala | H01Q 1/243 343/702 |

FOREIGN PATENT DOCUMENTS

| | | |
|---|---|---|
| JP | H-1122033 A | 1/1999 |
| JP | 2012186811 A | 9/2012 |
| WO | WO2004/112187 A1 | 12/2004 |
| WO | WO2011/123147 A1 | 10/2011 |
| WO | WO-2012147355 A1 | 11/2012 |

OTHER PUBLICATIONS

Chen, Z. et al.; "Bandwidth Enhancement of LTE/WWAN Printed Mobile Phone Antenna Using Slotted Ground Structure"; Process in Electromagnetics Research; vol. 129, pp. 469-483, 2012.

"ETS-Lindgren now Supports OTA Testing from 2G to 4G/LTE/MIMO Using Anritsu MT8820C RF Tester"; Mar. 9, 2012; <www.anritsu.com/en-US/Media-Room/News-releases/2012/2012-03-9-NRP003250.aspx>; 2 pgs.

* cited by examiner

APPARATUS FOR WIRELESS COMMUNICATION

TECHNOLOGICAL FIELD

Embodiments of the present invention relate to apparatus for wireless communication. In particular, they relate to apparatus for wireless communication in portable electronic devices.

BACKGROUND

Apparatus, such as portable electronic devices, usually include at least one antenna for enabling the apparatus to communicate wirelessly. In some apparatus, the housing of the apparatus includes a conductive part that is directly connected to radio frequency circuitry and operates as an antenna.

It would be desirable to provide an alternative apparatus.

BRIEF SUMMARY

According to various, but not necessarily all, embodiments of the invention there is provided apparatus comprising: a first feed point; a first radiator coupled to the first feed point; a housing defining an interior surface of the apparatus and including a first conductive cover portion coupled to the first radiator; a ground member coupled to the first conductive cover portion and positioned at least partially within the interior surface of the housing, at least the first conductive cover portion and the first radiator having an electrical length configured to resonate in a first operational frequency band, the first radiator being configured to electromagnetically couple to the first conductive cover portion.

The apparatus may be for wireless communication.

The first conductive cover portion may at least partially define a side surface of the apparatus.

The first feed point may be positioned on the first conductive cover portion, and the apparatus may further comprise a transmission line provided along at least a portion of the first conductive cover portion and configured to interconnect the first feed point with radio frequency circuitry.

The apparatus may further comprise a conductive member coupled to the first conductive cover portion, the first feed point being positioned on the conductive member.

The first conductive cover portion and the ground member may define an aperture there between, the dimensions of the aperture at least partially determine an electrical length of the first conductive cover portion.

The first radiator may have a first end connected to the first feed point, and a second end positioned adjacent the ground member.

The first radiator may be in a non-overlying relationship with the first conductive cover portion.

The apparatus may further comprise a second conductive cover portion having an electrical length resonant in a second operational frequency band, the first radiator and the first conductive cover portion may be configured to electromagnetically couple to the second conductive cover portion.

The apparatus may further comprise: a second feed point; a second radiator coupled to the second feed point, at least the second conductive cover portion and the second radiator having an electrical length configured to resonate in a third operational frequency band, the second radiator may be configured to electromagnetically couple to the second conductive cover portion.

The first conductive cover portion may have an electrical length resonant in a fourth operational frequency band, the second radiator and the second conductive cover portion may be configured to electromagnetically couple to the first conductive cover portion.

According to various, but not necessarily all, embodiments of the invention there is provided a portable electronic device comprising apparatus as described in any of the preceding paragraphs.

According to various, but not necessarily all, embodiments of the invention there is provided a method comprising: providing a first feed point; providing a first radiator coupled to the first feed point; providing a housing defining an interior surface of an apparatus and including a first conductive cover portion coupled to the first radiator; providing a ground member coupled to the first conductive cover portion and positioned at least partially within the interior surface of the housing, at least the first conductive cover portion and the first radiator having an electrical length configured to resonate in a first operational frequency band, the first radiator being configured to electromagnetically couple to the first conductive cover portion.

The first conductive cover portion may at least partially define a side surface of the apparatus.

The first feed point may be positioned on the first conductive cover portion.

The method may further comprise providing a conductive member coupled to the first conductive cover portion, the first feed point may be positioned on the conductive member.

The first conductive cover portion and the ground member may define an aperture there between, the dimensions of the aperture may at least partially determine an electrical length of the first conductive cover portion.

The first radiator may have a first end connected to the first feed point, and a second end positioned adjacent the ground member.

The first radiator may be in a non-overlying relationship with the first conductive cover portion.

The method may further comprise providing a second conductive cover portion having an electrical length resonant in a second operational frequency band, the first radiator and the first conductive cover portion may be configured to electromagnetically couple to the second conductive cover portion.

The method may further comprise: providing a second feed point; and providing a second radiator coupled to the second feed point, at least the second conductive cover portion and the second radiator having an electrical length configured to resonate in a third operational frequency band, the second radiator being configured to electromagnetically couple to the second conductive cover portion.

The first conductive cover portion may have an electrical length resonant in a fourth operational frequency band, the second radiator and the second conductive cover portion may be configured to electromagnetically couple to the first conductive cover portion.

BRIEF DESCRIPTION

For a better understanding of various examples that are useful for understanding the brief description, reference will now be made by way of example only to the accompanying drawings in which.

DETAILED DESCRIPTION

In the following description, the wording 'connect' and 'couple' and their derivatives mean operationally connected or coupled. It should be appreciated that any number or combination of intervening components can exist (including no intervening components). Additionally, it should be appreciated that the connection or coupling may be a physical galvanic connection and/or an electromagnetic connection.

FIGS. 2, 3, 5 and 6 illustrate apparatus 12, 121, 122, 123, 124 comprising: a first feed point 26; a first radiator 28 coupled to the first feed point 26; a first conductive cover portion 24 defining an interior surface 30 of the apparatus and coupled to the first radiator 28; a ground member 18 coupled to the first conductive cover portion 24 and positioned at least partially within the interior surface 30 of the first conductive cover portion 24, at least the first conductive cover portion 24 and the first radiator 28 having an electrical length configured to resonate in a first operational frequency band, the first radiator 28 being configured to electromagnetically couple to the first conductive cover portion 24.

Figure 1:
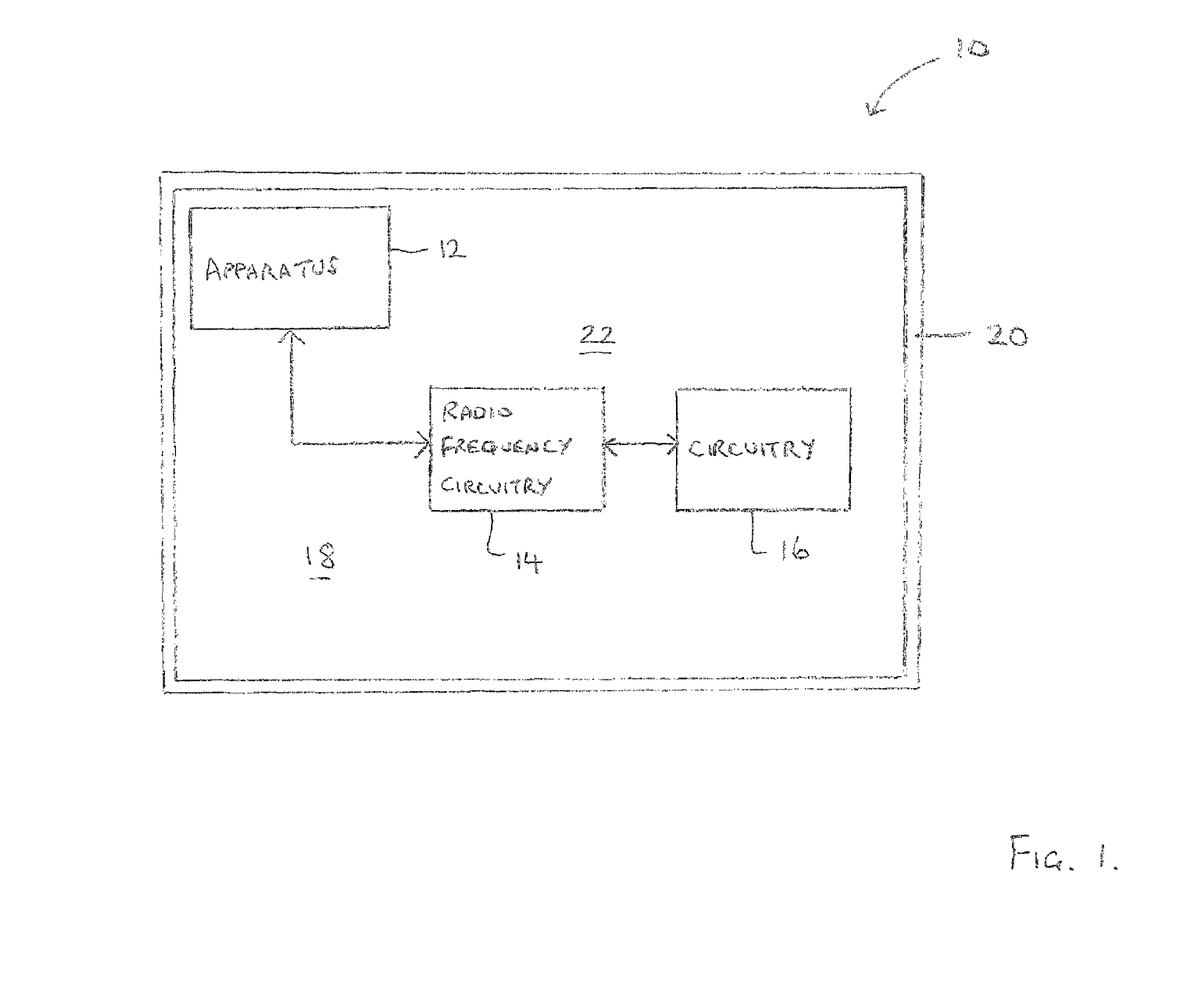
FIG. 1 illustrates a schematic diagram of a portable electronic device according to various examples.

In more detail, FIG. 1 illustrates an electronic device 10 which may be any apparatus such as a hand portable electronic device (for example, a mobile cellular telephone, a tablet computer, a laptop computer, a personal digital assistant or a hand held computer), a non-portable electronic device (for example, a personal computer or a base station for a cellular network), a portable multimedia device (for example, a music player, a video player, a game console and so on) or a module for such devices. As used here, the term 'module' refers to a unit or apparatus that excludes certain parts or components that would be added by an end manufacturer or a user.

The electronic device 10 comprises an apparatus 12, radio frequency circuitry 14, circuitry 16, a ground member 18 and a housing 20. The apparatus 12 includes one or more antennas that are configured to transmit and receive, transmit only or receive only electromagnetic signals. The radio frequency circuitry 14 is connected between the apparatus 12 and the circuitry 16 and may include a receiver and/or a transmitter and/or a transceiver. The circuitry 16 is operable to provide signals to, and/or receive signals from the radio frequency circuitry 14. The electronic device 10 may optionally include one or more matching circuits, filters, switches, or other radio frequency circuit elements, and combinations thereof, between the apparatus 12 and the radio frequency circuitry 14.

The radio frequency circuitry 14 and the apparatus 12 may be configured to operate in a plurality of operational resonant frequency bands and via one or more protocols. For example, the operational frequency bands and protocols may include (but are not limited to) Long Term Evolution (LTE) (US) (734 to 746 MHz and 869 to 894 MHz), Long Term Evolution (LTE) (rest of the world) (791 to 821 MHz and 925 to 960 MHz), amplitude modulation (AM) radio (0.535-1.705 MHz); frequency modulation (FM) radio (76-108 MHz); Bluetooth (2400-2483.5 MHz); wireless local area network (WLAN) (2400-2483.5 MHz); hiper local area network (HiperLAN) (5150-5850 MHz); global positioning system (GPS) (1570.42-1580.42 MHz); US-Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), ultra wideband (UWB) Lower (3100-4900 MHz); UWB Upper (6000-10600 MHz); digital video broadcasting-handheld (DVB-H) (470-702 MHz); DVB-H US (1670-1675 MHz); digital radio mondiale (DRM) (0.15-30 MHz); worldwide interoperability for microwave access (WiMax) (2300-2400 MHz, 2305-2360 MHz, 2496-2690 MHz, 3300-3400 MHz, 3400-3800 MHz, 5250-5875 MHz); digital audio broadcasting (DAB) (174.928-239.2 MHz, 1452.96-1490.62 MHz); radio frequency identification low frequency (RFID LF) (0.125-0.134 MHz); radio frequency identification high frequency (RFID HF) (13.56-13.56 MHz); radio frequency identification ultra high frequency (RFID UHF) (433 MHz, 865-956 MHz, 2450 MHz).

A frequency band over which an antenna can efficiently operate using a protocol is a frequency range where the antenna's return loss is less than an operational threshold. For example, efficient operation may occur when the antenna's return loss is better than (that is, less than) −4 dB or −6 dB.

In the embodiment where the electronic device 10 is a portable electronic device (such as a mobile phone), the circuitry 16 may include a processor, a memory and input/output devices such as an audio input device (a microphone for example), an audio output device (a loudspeaker for example) and a display.

The apparatus 12 and the electronic components that provide the radio frequency circuitry 14 and the circuitry 16 may be interconnected via the ground member 18 (for example, a printed wiring board). The ground member 18 may be used as a ground plane for the apparatus 12 by using one or more layers of the printed wiring board 18. In other embodiments, some other conductive part of the electronic device 10 (a battery cover or a chassis within the interior of the housing 20 for example) may be used as the ground member 18 for the apparatus 12. In some examples, the ground member 18 may be formed from several conductive parts of the electronic device 10, one part which may include the printed wiring board. The ground member 18 may be planar or non-planar.

The housing 20 has an exterior surface that defines one or more exterior visible surfaces of the electronic device 10 and also has an interior surface that defines a cavity 22 configured to house the electronic components of the electronic device 10 such as the apparatus 12, the radio frequency circuitry 14, the circuitry 16 and the ground member 18. In some examples, the apparatus 12 may include a plurality of separate housings 20.

The apparatus 12 is described in the following paragraphs with reference to several examples.

Figure 2:
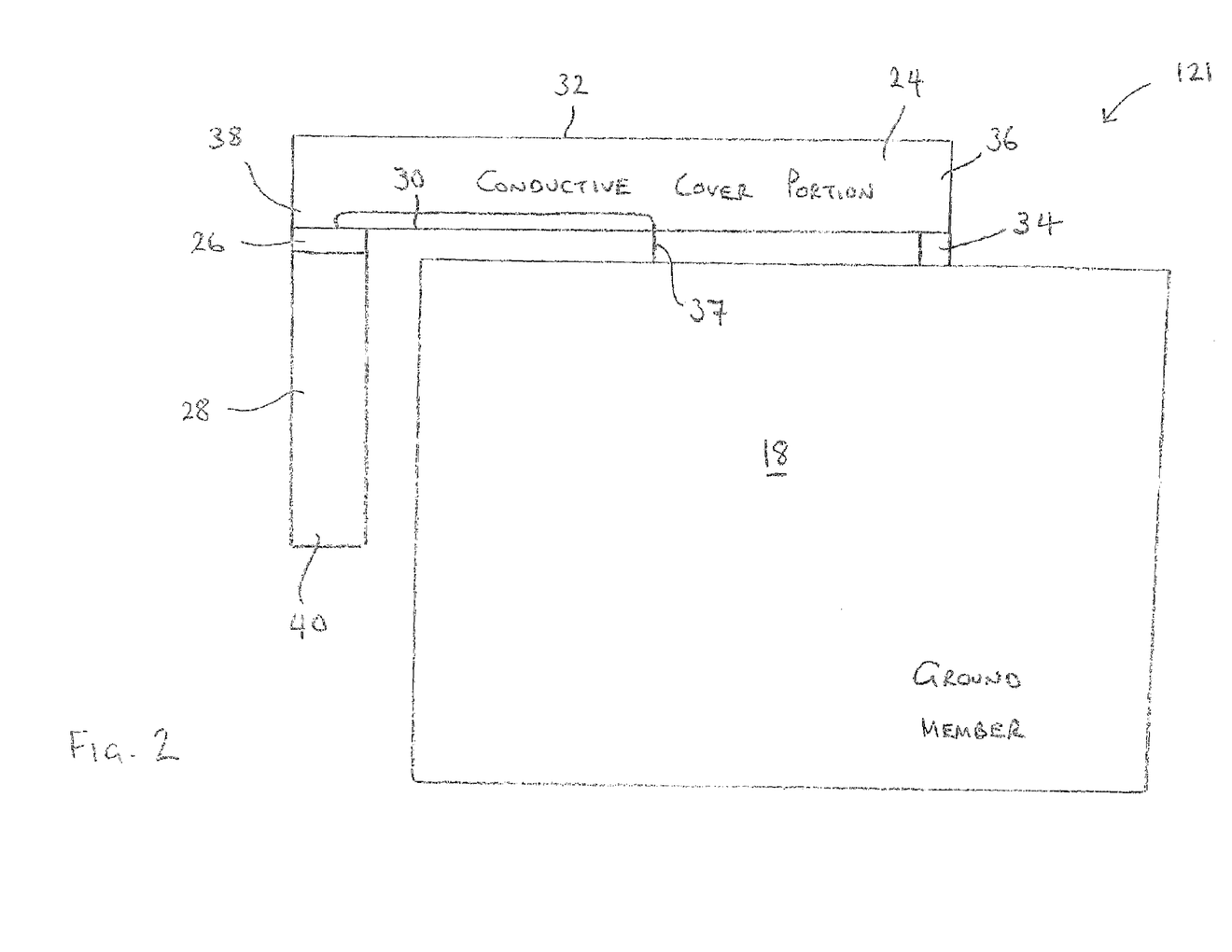
FIG. 2 illustrates a schematic diagram of an apparatus according to various examples.

FIG. 2 illustrates a schematic diagram of an apparatus 121 according to various examples. The apparatus 121 includes a ground member 18, a conductive cover portion 24, a feed point 26 and a radiator 28.

Figure 3:
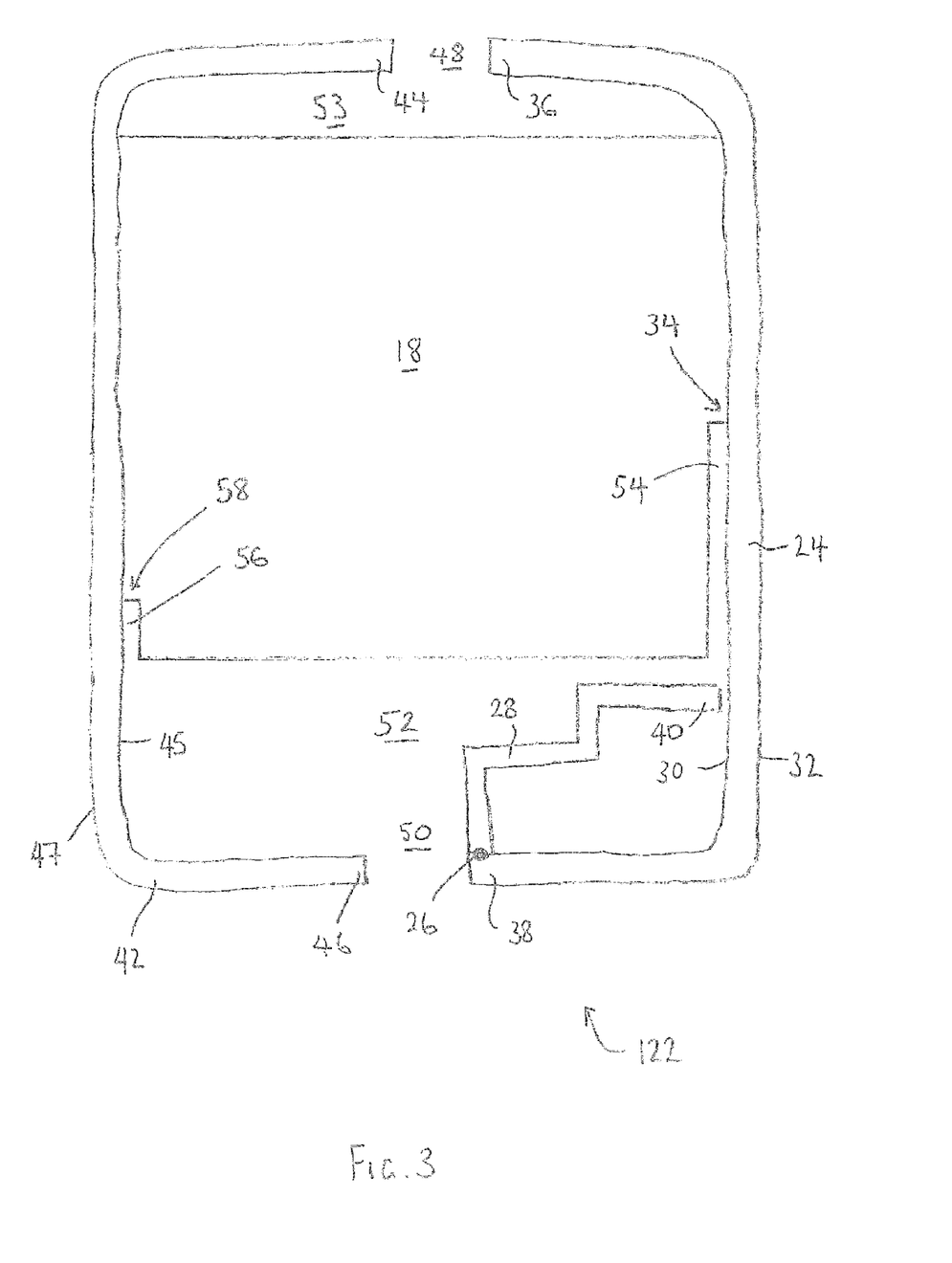
FIG. 3 illustrates a plan view of another apparatus according to various examples.

The conductive cover portion 24 forms at least part of the housing 20 and may have any shape. For example, the conductive cover portion 24 may form a side surface of the device 10 and may have a U shape when viewed in plan (as illustrated in FIG. 3). In other examples, the conductive cover portion 24 may form a back surface of the device 10 and have a rectangular shape. In further examples, the conductive cover portion 24 may be mounted on the interior of a non-conductive housing portion and have a meandering shape.

The housing 20 may comprise a plurality of conductive cover portions 24 that may or may not be galvanically connected to one another. The conductive cover portion 24 may comprise any conductive material and may comprise one or more metals and/or one or more conductive polymers for example.

The conductive cover portion 24 may define an interior surface 30 of the apparatus 121 and device 10. In some examples, one or more layers of other material (such as a dielectric material, an insulating material, or a material to increase the structural strength of the housing 20, for example) may be provided on the interior surface 30 of the conductive cover portion 24, and in other examples, no additional layers of other material are provided on the interior surface 30.

The conductive cover portion 24 may also define an exterior surface 32 of the apparatus 121 and device 10 and consequently form at least part of the exterior visible surface of the apparatus 121 and the device 10. In some examples, one or more layers of other non-conductive material (such as a protective plastic coating or cover for example) may be provided on the exterior surface 32 of the conductive cover portion 24, and in other examples, no additional layers of other material are provided on the exterior surface 32.

The conductive cover portion 24 is coupled to the ground member 18 via a ground point 34. The ground point 34 is connected to a first end 36 of the conductive cover portion 24 in FIG. 2, but may be connected to any other location along the conductive cover portion 24 in other examples. The ground member 18 is positioned within the interior surface of the housing 20 and may therefore be positioned within the interior surface 30 of the conductive cover portion 24. In other embodiments, the conductive cover portion 24 may overlay the ground member 18.

The radiator 28 is coupled to the feed point 26 and may therefore provide signals to, and/or receive signals from the radio frequency circuitry 14. A transmission line 37 (such as a coaxial cable) interconnects the feed point 26 and the radio frequency circuitry 14 and is arranged to transport signals between the feed point 26 and the radio frequency circuitry 14. The transmission line 37 may be provided on and be physically coupled to at least a portion of the conductive cover portion 24 (as illustrated in FIG. 2).

Figure 5:
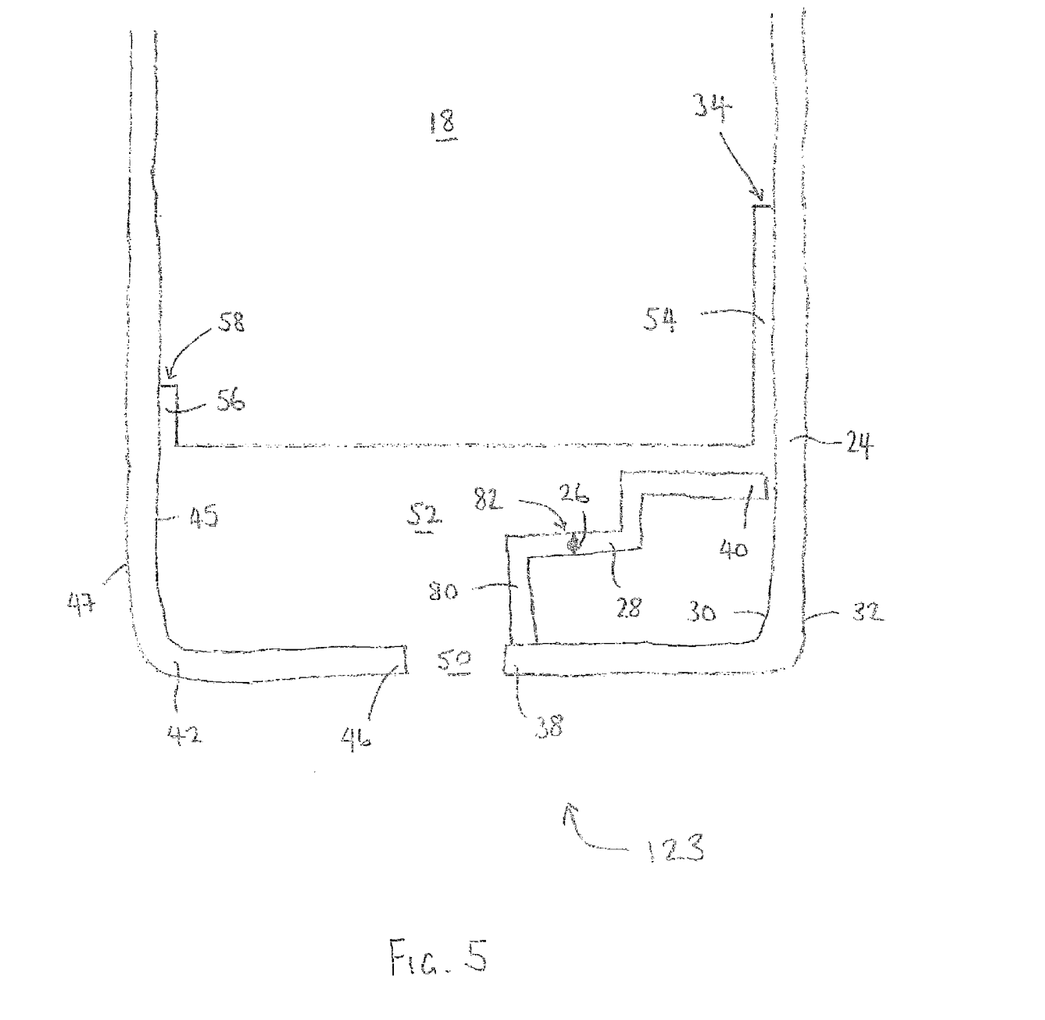
FIG. 5 illustrates a plan view of a further apparatus according to various examples.

The radiator 28 is also coupled to a second end 38 of the conductive cover portion 24 and extends from the conductive cover portion 24 until an end 40. In some examples, the radiator 28 may not be coupled to the second end 38 and may instead be coupled between the first and second ends 36, 38 of the conductive cover portion 24, or may be coupled to a conductive member that is connected to the conductive cover portion 24 (as illustrated in FIG. 5). The radiator 28 may have any suitable shape and may be a monopole or a folded monopole for example. In some examples, the radiator 28 is planar, and in other examples, the radiator 28 may be non-planar.

The radiator 28 is configured to electromagnetically couple to the conductive cover portion 24 (that is, the conductive cover portion 24 may parasitically couple to the radiator 28). The conductive cover portion 24 and the radiator 28 have an electrical length that is configured to resonate in a first operational frequency band (which may be any of the operational frequency bands mentioned in the preceding paragraphs, but not limited to these bands). The electrical length of the conductive cover portion 24 and the radiator 28 includes the physical lengths of the conductive cover portion 24 and the radiator 28 measured between the ground point 34 and the end 40 of the radiator 28 and any reactive components (such as one or more capacitors and/or one or more inductors) there between. The electrical length of the conductive cover portion 24 and the radiator 28 may also include the length of the ground plane 18, to the point furthest from the feed point 26.

FIG. 3 illustrates a plan view of another apparatus 122 according to various examples. The apparatus 122 is similar to the apparatus 121 illustrated in FIG. 2 and where the features are similar, the same reference numerals are used.

The apparatus 122 differs from the apparatus 121 in that the apparatus 122 comprises a first conductive cover portion 24 and a second conductive cover portion 42. The first conductive cover portion 24 is U shaped when viewed in plan (the first end 36 and the second end 38 defining the ends of the U) and forms a side surface of the apparatus 122. The second conductive cover portion 42 is also U shaped when viewed in plan (having a first end 44 and a second end 46 that define the ends of the U) and also forms a side surface of the apparatus 122. The second conductive cover portion 42 defines an interior surface 45 and an exterior surface 47 of the apparatus 122 and electronic device 10.

The first end 36 of the first conductive cover portion 24 and the first end 44 of the second conductive cover portion 42 define a gap 48 there between in which electronic components (such as a Universal Serial Bus (USB) connector or an audio connector for example) may advantageously be positioned.

In other examples, there may be no gap 48 and the first end 36 of the first conductive cover portion 24 and the first end 44 of the second conductive cover portion 42 may form a unitary conductive cover portion 24, 42. In these other examples electronic components may still be positioned in apertures formed in the unitary conductive cover portion 24, 42 at any location along its length.

The second end 38 of the first conductive cover portion 24 and the second end 46 of the second conductive cover portion 42 also define a gap 50 there between in which electronic components may be positioned. The gaps 48, 50 are defined in the transverse edges of the electronic device 10 and consequently, the longitudinal edges of the electronic device 10 may advantageously be formed by continuous conductive material (such as metal) which is aesthetically pleasing to the end user of the device 10. The gaps 48, 50 may be covered by a door or other cover that hides and protects the electronic components therein. If a conductive (for example, metal) door or other cover is used, it may be physically separate to the first ends 36, 44 (that is, the conductive door or other cover is electrically floating).

The ground member 18 is positioned within the interior surfaces 30, 45 of the first and second conductive cover portions 24, 42 respectively. The ground member 18 is spaced from the second ends 38, 46 of the first and second conductive portions 24, 42 (that is, the bottom transverse section of the conductive cover portions 24, 42) and defines a first aperture 52 there between.

The ground member 18 may also be spaced from the first ends 36, 44 of the first and second conductive portions 24, 42 (that is, the top transverse section of the conductive cover portions 24, 42) and defines another aperture 53 there between.

The ground member 18 is coupled to the longitudinal sections of the conductive cover portions 24, 42 and thereby grounds the conductive cover portions 24, 42 at least at one point. The longitudinal section of the first conductive cover portion 24 and the ground member 18 define a second aperture 54 (a slot in this example) there between. The second aperture 54 may be formed by removing a section of the ground member 18 in some examples. Additionally or alternatively, the second aperture 54 may be formed by modifying the interior surface 30 of the first conductive cover portion 24. For example, the second aperture 54 may be formed by a portion of the first conductive cover portion 24 being thinner than the remainder of the first conductive cover portion 24. The closed end of the second aperture 54 provides the ground point 34 for the first conductive cover portion 24. The dimensions of the second aperture 54 may be selected during manufacture of the apparatus 122 so that the first conductive cover portion 24 has a desired electrical length.

The longitudinal section of the second conductive cover portion 42 and the ground member 18 define a third aperture 56 (also a slot in this example) there between. The third aperture 56 may be formed by removing a section of the ground member 18 in some examples. The closed end of the third aperture 56 provides a ground point 58 for the second conductive cover portion 42. The dimensions of the third aperture 56 may be selected during manufacture of the apparatus 122 so that the second conductive cover portion 42 has a desired electrical length.

The radiator 28 is coupled to the second end 38 of the first conductive cover portion 24 via the feed point 26. The radiator 28 extends from the feed point 26 into the first aperture 52 defined between the conductive cover portions 24, 42 and the ground member 18 so that the end 40 of the radiator 28 is positioned adjacent the ground member 18. In other examples, the end 40 of the radiator 28 may be positioned away from the ground member 18 (that is, they are not adjacent one another). Consequently, the radiator 28 is in a non-overlying relationship with the first conductive cover portion 24 when the apparatus 122 is viewed in plan. In other examples, the radiator 28 may be in at least a partial overlying relationship with the first conductive cover portion 24 when the apparatus 122 is viewed in plan. In some examples, the radiator 28 is co-planar with the ground member 18, and in other examples, the radiator 28 may be positioned at least partially in a different plane to the ground member 18 and may overlay the ground member 18 at least partially.

Figure 4:
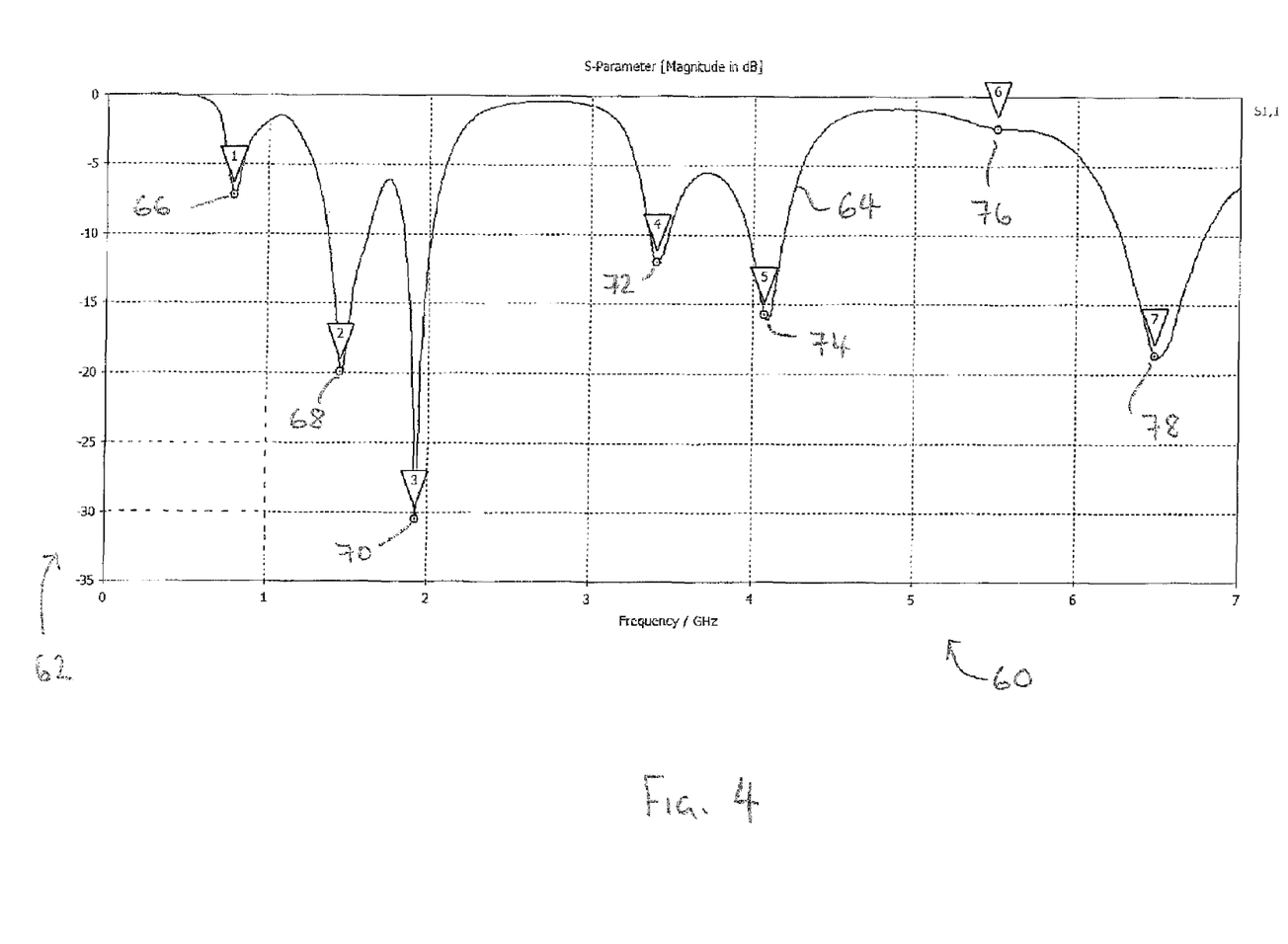
FIG. 4 illustrates a graph of return loss (dB) versus frequency for the apparatus illustrated in FIG. 3.

FIG. 4 illustrates a graph of return loss (dB) versus frequency for the apparatus 122 illustrated in FIG. 3. The graph includes an X axis 60 for frequency and a Y axis 62 for return loss (s-parameter, S11).

The graph also includes a line 64 that represents how the return loss of the apparatus 122 varies with frequency of operation. The line 64 has a first minimum 66, a second minimum 68, a third minimum 70, a fourth minimum 72, a fifth minimum 74, a sixth minimum 76 and a seventh minimum 78 that represent resonant modes of the apparatus 122.

The first minimum 66 corresponds to a quarter (¼) wavelength resonant mode across the electrical length of the radiator 28 and the first conductive cover portion 24 (that is, between the end 40 of the radiator 28 and the ground point 34). The first minimum 66 has a return loss of −7 dB at a frequency of 0.8 GHz.

The second minimum 68 corresponds to a half (½) wavelength resonant mode across the electrical length of the radiator 28 and the first conductive cover portion 24. The half wavelength resonant mode of the radiator 28 and the first conductive cover portion 24 electromagnetically couples to the second conductive cover portion 42 and in particular, a quarter (¼) wavelength mode across the electrical length of the second conductive cover portion 42 (between the second end 46 and the ground point 58). Consequently, the second conductive cover portion 42 advantageously contributes to the radiation pattern of the apparatus 122 and contributes to the second minimum 68. The second minimum 68 has a return loss of −20 dB at a frequency of 1.5 GHz.

The third minimum 70 corresponds to a three quarter (¾) wavelength resonant mode across the electrical length of the radiator 28 and the first conductive cover portion 24. The third minimum 70 has a return loss of −30 dB at a frequency of 1.9 GHz.

The fourth minimum 72 corresponds to a one and one quarter (1¼) wavelength resonant mode across the electrical length of the radiator 28 and the first conductive cover portion 24. The fourth minimum 72 has a return loss of −12 dB at a frequency of 3.4 GHz.

The fifth minimum 74 corresponds to a one and three quarter (1¾) wavelength resonant mode across the electrical length of the radiator 28 and the first conductive cover portion 24. The fifth minimum 74 has a return loss of −16 dB at a frequency of 4 Ghz.

The sixth minimum 76 corresponds to a two and one quarter (2¼) wavelength resonant mode across the electrical length of the radiator 28 and the first conductive cover portion 24. The sixth minimum 76 has a return loss of −2 dB at a frequency of 5.5 GHz.

The seventh minimum 78 corresponds to a two and three quarter (2¾) wavelength resonant mode across the electrical length of the radiator 28 and the first conductive cover portion 24. The seventh minimum 78 has a return loss of −19 dB at a frequency of 6.5 GHz.

FIG. 5 illustrates a plan view of a further apparatus 123 according to various examples. The apparatus 123 is similar to the apparatus 122 illustrated in FIG. 3 and where the features are similar, the same reference numerals are used.

The apparatus 123 differs from the apparatus 122 in that the radiator 28 is coupled to the first conductive cover portion 24 via a conductive member 80. The conductive member 80 extends from the second end 38 of the first conductive cover portion 24 into the aperture 52 until an end 82. The feed point 26 is positioned at the end 82 of the conductive member 80 and the radiator 28 is coupled to the feed point 26. In some examples, the feed point 26 may not be positioned at the end 82 of the conductive member 80, but may instead be positioned along the length of the conductive member 80.

The conductive member 80 provides an advantage in that the length of the conductive member 80 and/or the position of the feed point 26 on the conductive member 80 may be selected to provide a desired electrical length (and thus desired operational frequency bands) for the radiator 28, the conductive member 80 and the first conductive cover portion 24 and their combination.

Additionally, the conductive member 80 may also provide an advantage in that the impedance of the apparatus may be chosen so that it is better matched to the target characteristic impedance (Zo). The location of the feed point 26 can affect the impedance match achieved across one or more of the bands in which the apparatus operates. The position of the feed point 26 may be varied along the length and/or the width of the conductive member 80 and/or the conductive cover portion 24 until the desired impedance match is achieved and then that point on the conductive member 80 (or conductive cover portion 24) is selected for the apparatus.

The apparatus 121, 122, 123 provides an advantage in that the apparatus may be relatively unaffected by external objects (such as a user's hand) coming into contact with the conductive cover portions 24, 42 because the radiator 28 extends within the apparatus and is therefore not accessible to external objects which may detune the radiator 28.

The apparatus 121, 122, 123 also provides an advantage in that second conductive cover portion 42 parasitically couples to the radiator 28 and the first conductive cover portion 24 and at least partially provides the second minimum 68 mentioned in the preceding paragraphs. Furthermore, the second conductive cover portion 42 may increase the bandwidth of the resonant modes of the radiator 28 and the first conductive cover portion 24.

The apparatus 121, 122, 123 is also advantageous in that the apparatus may be resonant in a plurality of operational frequency bands. The apparatus may be configured to be operable in LTE frequency bands and also in operational frequency bands that enable communication of audio (such as CDMA). Consequently, the apparatus 121, 122 may provide simultaneous voice (CDMA) and data (LTE) performance (which may be referred to as SV-LTE).

Figure 6:
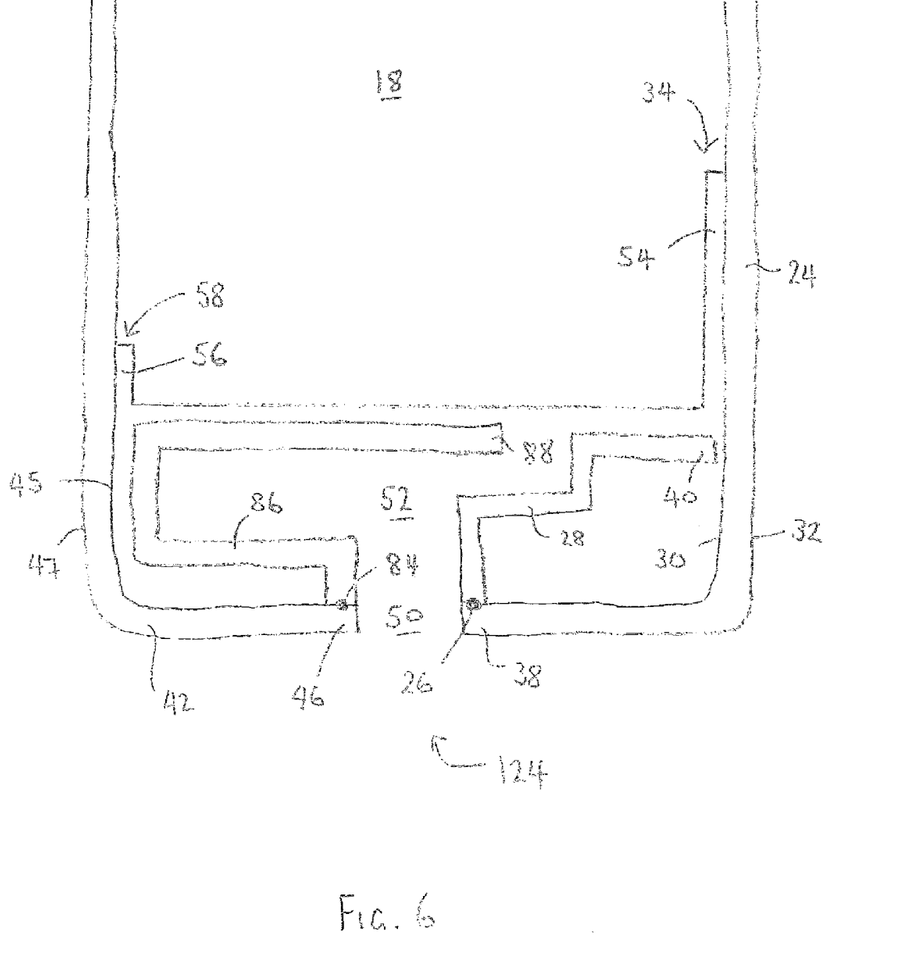
FIG. 6 illustrates a plan view of another apparatus according to various examples.

FIG. 6 illustrates a plan view of another apparatus 124 according to various examples. The apparatus 124 is similar to the apparatus 122 illustrated in FIG. 3 and where the features are similar, the same reference numerals are used.

The apparatus 124 differs from the apparatus 122 in that the apparatus 124 further comprises a second feed point 84 and a second radiator 86. The second feed point 84 is positioned at the second end 46 of the second conductive cover portion 42. In other examples, the second feed point 84 may be positioned at any other location along the second conductive cover portion 42. The second feed point 84 is coupled to the radio frequency circuitry 14 and may therefore provide signals to the radio frequency circuitry 14, and/or receive signals from the radio frequency circuitry 14. For example, a transmission line (such as a coaxial cable) may interconnect the second feed point 84 and the radio frequency circuitry 14 and be arranged to transport signals between the second feed point 84 and the radio frequency circuitry 14. The transmission line may be provided on at least a portion of the second conductive cover portion 42.

The second radiator 86 is a folded monopole and is coupled to the second conductive cover portion 42 via the second feed point 84. The second radiator 86 extends from the second feed point 84 and into the aperture 52 defined between the ground member 18 and the conductive cover portions 24, 42 to an end 88. The end 88 of the second radiator 86 is positioned adjacent the ground member 18. In other examples, the end 88 of the second radiator 86 may be positioned away from the ground member 18 (that is, they are not adjacent one another) and may be positioned to overlay first conductive cover portion 24 or the second conductive cover portion 42. In other examples, the second radiator 86 may have a different structure (for example, the second radiator 86 may be a monopole) and may be planar or non-planar.

The second radiator 86 is configured to electromagnetically couple to the second conductive cover portion 42 (that is, the second conductive cover portion 42 may parasitically couple to the second radiator 86). The second conductive cover portion 42 and the second radiator 86 have an electrical length that is configured to resonate in at least one operational frequency band (which may be any of the operational frequency bands mentioned in the preceding paragraphs, and not limited to these bands). In some examples, the second conductive cover portion 42 and the second radiator 86 have an electrical length that is configured to resonate in a plurality of operational frequency bands and may have resonant modes as described in the preceding paragraphs with reference to FIG. 4. The electrical length of the second conductive cover portion 42 and the second radiator 86 includes the physical lengths of the second conductive cover portion 42 and the second radiator 86 measured between the ground point 58 and the end 88 of the second radiator 86 and any reactive components (such as one or more capacitors and/or one or more inductors) there between.

At least one resonant mode of the second radiator 86 and the second conductive cover portion 42 electromagnetically couples to the first conductive cover portion 24 (for example, a quarter (¼) wavelength mode across the electrical length of the first conductive cover portion 24 between the second end 38 and the ground point 34). Consequently, the first conductive cover portion 24 advantageously contributes to- the radiation pattern of the second radiator 86 and the second conductive cover portion 42 and increases the bandwidth of the at least one resonant mode.

Similarly, one resonant mode of the first radiator 28 and the first conductive cover portion 24 electromagnetically couples to the second conductive cover portion 42 (for example, a quarter wavelength mode across the electrical length of the first conductive cover portion 24 between the second end 38 and the ground point 34). Consequently, the second conductive cover portion 42 advantageously contributes to the radiation pattern and bandwidth of the first radiator 28 and the first conductive cover portion 24.

Figure 7:
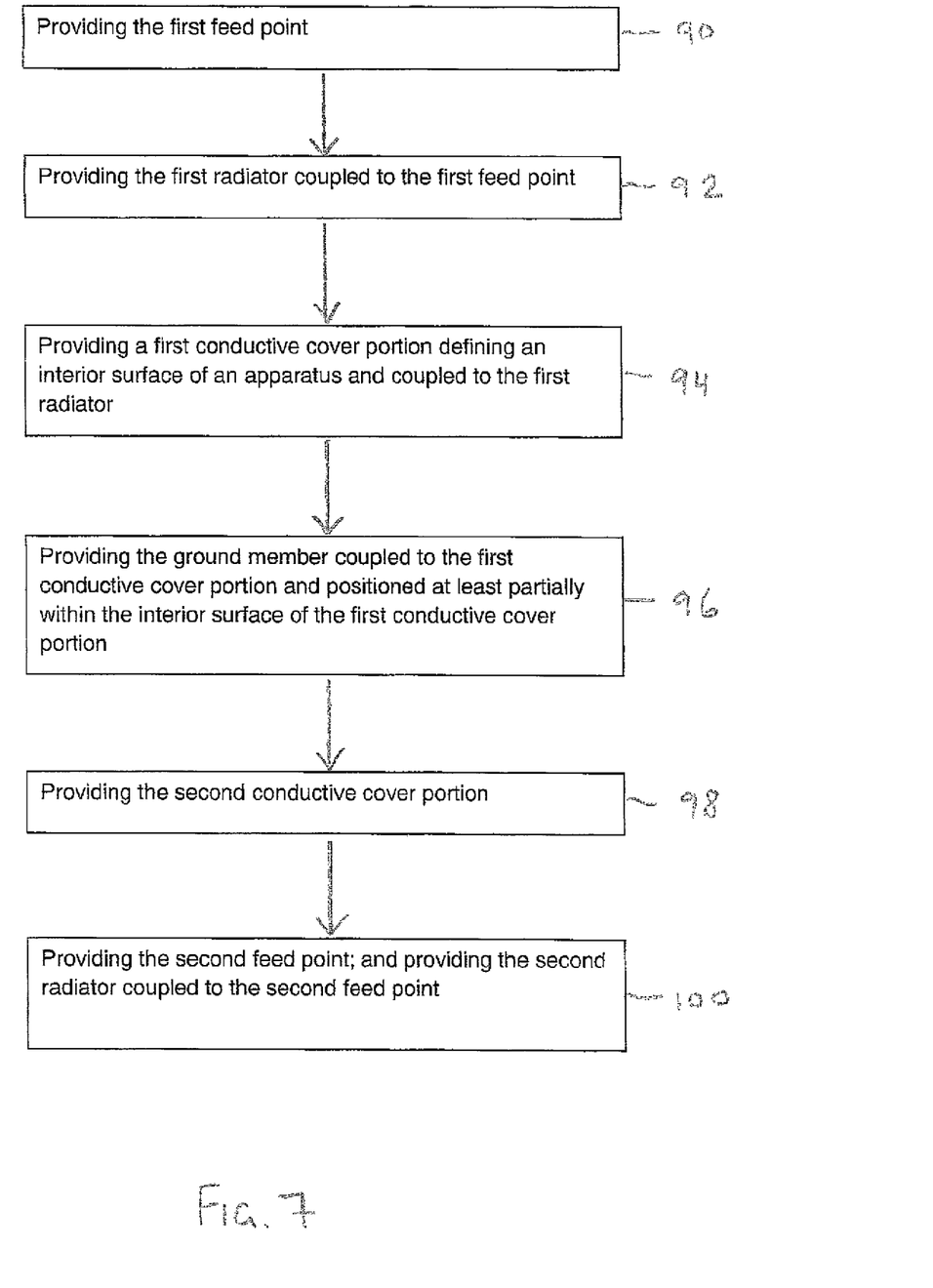
FIG. 7 illustrates a flow diagram of a method of manufacturing an apparatus according to various examples.

FIG. 7 illustrates a flow diagram of a method of manufacturing an apparatus 12, 121, 122, 123, 124 according to various examples.

At block 90, the method includes providing the first feed point 26.

At block 92, the method includes providing the first radiator 28 and coupling the first radiator 28 to the first feed point 26.

At block 94, the method includes providing the first conductive cover portion 24 and (optionally) the conductive member 80. In some examples, the first feed point 26 is provided on the first conductive cover portion 24. In other examples, the first feed point 26 is provided on the conductive member 80.

At block 96, the method includes providing the ground member 18 within the interior surface 30 of the first conductive cover portion 24 and coupling the ground member 18 to the first conductive cover portion 24.

At block 98, the method may include providing the second conductive cover portion 42.

At block 100, the method may include providing the second feed point 84 and the second radiator 86. In some examples, the second feed point 84 is positioned on the second conductive cover portion 24. In other examples, the second feed point 84 may be positioned on a conductive member (as illustrated in FIG. 5).

The blocks illustrated in the FIG. 7 may represent steps in a method and/or sections of code in a computer program, For example, a controller may use the computer program to control machinery to perform the blocks illustrated in FIG. 7. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed. For example, the feed point 26 may be located at any position between the ends 34 and 38 of the conductive cover portion 24. Additionally, the radiator 28 may have an overlaying relationship with the conductive cover portion 24 when viewed in plan. Furthermore, the conductive member 80 may extend from any position between the ends 34 and 38 of the conductive cover portion 24.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. Apparatus comprising:
a first feed point;
a first radiator coupled to the first feed point;
a housing defining an interior surface of the apparatus and including a first conductive cover portion coupled to the first radiator and a second conductive cover portion, different from the first radiator and the first conductive cover portion, wherein the first conductive cover portion defines a first exterior surface of the apparatus and the second conductive cover portion defines a second exterior surface of the apparatus, wherein an end of the first conductive cover portion and an end of the second conductive cover portion define a gap there between;
a ground member coupled to the first radiator via the first conductive cover portion and positioned at least partially within a cavity defined by the interior surface of the housing, at least the first conductive cover portion and the first radiator having an electrical length configured to resonate in a first operational frequency band, the first radiator being configured to electromagnetically couple to the first conductive cover portion.

2. Apparatus as claimed in claim 1, wherein the first conductive cover portion at least partially defines a side surface of the apparatus.

3. Apparatus as claimed in claim 1, wherein the first feed point is positioned inside the first conductive cover portion, and the apparatus further comprises a transmission line provided along at least a portion of the first conductive cover portion and configured to interconnect the first feed point with radio frequency circuitry.

4. Apparatus as claimed in claim 1, further comprising a conductive member coupled to the first conductive cover portion, the first feed point being positioned on the conductive member.

5. Apparatus as claimed in claim 1, wherein the first conductive cover portion and the ground member define an aperture there between, the dimensions of the aperture at least partially determining an electrical length of the first conductive cover portion.

6. Apparatus as claimed in claim 1, wherein the first radiator has a first end connected to the first feed point inside the apparatus, and a second end positioned adjacent the ground member.

7. Apparatus as claimed in claim 1, wherein the first radiator is in a non-overlying relationship with the first conductive cover portion.

8. Apparatus as claimed in claim 1, the second conductive cover portion having an electrical length resonant in a second operational frequency band, the first radiator and the first conductive cover portion being configured to electromagneticaliy couple to the second conductive cover portion.

9. Apparatus as claimed in claim 8, further comprising: a second feed point; a second radiator coupled to the second feed point, at least the second conductive cover portion and the second radiator having an electrical length configured to resonate in a third operational frequency band, the second radiator being configured to electromagneticaliy couple to the second conductive cover portion.

10. Apparatus as claimed in claim 9, wherein the first conductive cover portion has an electrical length resonant in a fourth operational frequency band, the second radiator and the second conductive cover portion being configured to electromagneticaliy couple to the first conductive cover portion.

11. An apparatus as claimed in claim 9, wherein the first radiator is configured to parasitically couple to the first conductive cover portion and wherein the second radiator is configured to parasitically couple to the second conductive cover portion.

12. A portable electronic device comprising apparatus as claimed in claim 1.

13. An apparatus as claimed in claim 1, wherein the first radiator is configured to parasitically couple to the first conductive cover portion.

14. An apparatus as claimed in claim 1, wherein the first radiator extends only within the apparatus and is inaccessible to an object external to the apparatus.

15. An apparatus as claimed in claim 1, wherein the first radiator is coupled to the first feed point within the apparatus and not at the first conductive cover portion.

16. An apparatus as claimed in claim 1, comprising an electrically conducting component in the gap.

17. An apparatus as claimed in claim 16, wherein the electrically conducting component is electrically floating with respect to the respective ends.

18. An apparatus as claimed in claim 1, wherein a section of the first conductive cover portion terminating at the end of the first conductive cover portion extends along a first edge of the housing, and wherein a section of the second conductive cover portion terminating at the end of the second conductive cover portion extends along the first edge of the housing, such that the gap is defined in the first edge of the housing.

19. A method comprising:
providing a first feed point;
providing a first radiator coupled to the first feed point;
providing a housing defining an interior surface of an apparatus and including a first conductive cover portion coupled to the first radiator and a second conductive cover portion, different from the first radiator and the first conductive cover portion, wherein the first conductive cover portion defines a first exterior surface of the apparatus and the second conductive cover portion defines a second exterior surface of the apparatus, wherein an end of the first conductive cover portion and an end of the second conductive cover portion define a gap there between;
providing a ground member coupled to the first radiator via the first conductive cover portion and positioned at least partially within a cavity defined by the interior surface of the housing, at least the first conductive cover portion and the first radiator having an electrical length configured to resonate in a first operational frequency band, the first radiator being configured to electromagnetically couple to the first conductive cover portion.

\* \* \* \* \*